3,376,194
METHOD OF TREATING HYPERTENSION EMPLOYING SELECTED THIOUREAS
Arthur Berger, Skokie, Ill., and Edeltraut E. Borgaes, Delmenhorst, Germany, assignors to Baxter Laboratories, Inc., Morton Grove, Ill., a corporation of Delaware
No Drawing. Continuation-in-part of application Ser. No. 334,636, Dec. 30, 1963. This application Sept. 26, 1966, Ser. No. 581,708
4 Claims. (Cl. 167—65)

ABSTRACT OF THE DISCLOSURE

This invention is concerned with methods of treating hypertension with thioureas.

---

The present application is a continuation-in-part of co-pending application Ser. No. 334,636, filed Dec. 30, 1963, now abandoned.

The present invention relates to a method for treating hypertension in mammals by administration of selected thioureas. More particularly, the method of this invention comprises the step of administering to a hypertensive mammal a small but effective amount of a compound selected from the group consisting of 1-2',4'-dimethylphenyl)-2-methyl-2-thiourea, 1-(2',3'-dimethylphenyl)-3-methyl-2-thiourea, and 1,1-dimethyl-3-(2'-methylphenyl) 3 - methyl - 2-thiourea, and 1,1-dimethyl-3-(2'-methylphenyl)-2-thiourea.

In accordance with the invention, when the above compounds are formulated with solid or liquid pharmaceutically accepted carriers and administered orally, rectally or parenterally to hypertensive mammals, an immediate and prolonged drop in blood pressure results. When employed intravenously, the preferred dosage range is from about 0.1 to about 20 mg./kg. daily. Orally or rectally, the dosage will preferably vary from about 1 to about 100 mg./kg. daily. Higher and lower dosages may also be effective, depending upon the present level of blood pressure in the mammal and the level to which it is desired to be reduced.

The preferred method of administration is orally in the form of tablets. The tablets can be prepared by conventional procedures for making pharmaceutical tablets, for example, by compressing or molding, and can employ conventional fillers and the like materials, for example, diluents, binders, lubricants, disintegrators, coloring and flavoring agents in addition to the active hypotensive compounds herein-defined. Examples of such materials are corn starch, gelatin, gums such as carboxymethyl cellulose, acacia and locust bean gum, sugars such as sucrose, dextrose and lactose, salts such as sodium chloride, calcium phophate and calcium sulfate, and the like materials. When administered intravenously, the compounds employed in the method of this invention are preferably dissolved in sterile distilled water or other physiologically acceptable media.

The compounds employed in the method of this invention can be prepared by reacting a substituted aniline with either methyl isothiocyanate or carbon disulfide and the appropriate amine or by other methods known to those skilled in the art.

More specifically, the compounds employed in the method of this invention were prepared in accordance with the examples given below.

EXAMPLE I

To a well-stirred mixture of 3.65 g. (0.05 mole) of methyl isothiocyanate dissolved in 35 ml. of ethanol was slowly added 6.05 g. (0.05 mole) of 2,4-dimethylaniline. The mixture was heated under reflux for 1½ hours, then allowed to cool to room temperature. The solid which formed was collected on a filter, washed with petroleum ether to remove color and then recrystallized from ethanol. 6.1 g. of product consisting of white needles was obtained and it had M.P.159–161° C. which corresponds to the melting point of 1-(2',4'-dimethylphenyl)-3-methyl-2-thiourea.

EXAMPLE II

To a stirred solution of 36.5 g. (0.50 mole) of methyl isothiocyanate dissolved in 250 ml. of methanol was added 60.5 g. (0.50 mole) of 2,3-dimethylaniline. The resulting mixture was warmed to initiate the reaction and once started additional heat was not required. Subsequently the reaction mixture was allowed to cool to room temperature after which the solid was collected on a filter and washed with petroleum ether. Recrystallization from ethanol yielded 80.0 g. of a white solid product having a melting point of 177–8° C. which corresponds to that of 1-(2',3'-dimethylphenyl)-3-methyl-2-thiourea.

EXAMPLE III

In a 2 l. flask fitted with a mechanical stirrer, thermometer, condenser and dropping funnel cooled in an ice-bath, was placed 188 mls. (1.0 moles) of 5.34 N dimethylamine dissolved in absolute denatured alcohol. After the temperature had dropped to 5° C., a solution of 76 g. (1 mole) of carbon disulfide in 100 ml. of absolute ethanol which had been precooled, was added at a rate so that the temperature of the reaction mixture did not rise above 10° C. Ten minutes after the addition was completed, the ice-bath was removed and 111.3 g. (1.04 moles) of o-toluidine dissolved in 100 ml. of absolute alcohol was added in a single portion. The mixture was now heated under reflux for 96 hours. On coating, the product crystallized and the solid was collected. Recrystallization from ethanol and drying yielded 107.7 g. of long shiny white needles having a melting point of 138–139° C. which corresponds to that of 1,1-dimethyl-3-(2'-methylphenyl)-2- thiourea.

The pharmacological evaluation of the compounds employed in the method of this invention involved testing the effect of the compounds on cardiovascular parameters in anesthetized, normotensive dogs. The subject compounds were administered intravenously to the dogs. Femoral blood pressure, pressor responses following bilateral carotid artery occlusion and heart rate were monitored at 20 minute intervals following administration of the compounds until response to the compounds was no longer observable. Hypotensive activity is considered present if a sustained 20% lowering of blood pressure occurs, and sympathetic reactivity inhibition is considered to be present if the normal carotid occlusion reflex is decreased by at least 25%

In carrying out these pharmacological evaluations, each test was initiated with a standard dose of 20 milligrams per kilogram of body weight. The compounds employed in the method of this invention were found to be active hypotensives at this standard dose. The compounds were then administered with gradual lowering of the dosage until the threshold dosage (the minimum hypotensive dose and duration and the minimum sympathetic reactivity inhibitory dose and duration) was obtained. The results are reported in the following table.

| Compound | Minimum Hypotensive Dose and Duration | Minimum Sympathetic Reactivity Inhibitory Dose and Duration |
|---|---|---|
| 1-(2',4'-dimethylphenyl)-3-methyl-2-thiourea. | 1.25 mg./kg.; 3 hrs. | 1.25 mg./kg.; 4 hrs. |
| 1-(2',3'-dimethylphenyl)-3-methyl-2-thiourea. | 2.50 mg./kg.; >3 hrs. | 0.313 mg./kg.; >5 hrs. |
| 1,1-dimethyl-3-(2'-methylphenyl)-2-thiourea. | 0.156 mg./kg.; >4 hrs. | 0.156 mg./kg.; >5 hrs. |

It is obvious from the data appearing in the table that the compounds employed in the method of this invention are very effective hypotensives. This is surprising and unexpected, since many compounds of closely related structure exhibit no hypotensive activity whatever.

The compounds of this invention were also administered orally to hypertensive dogs and evoked good hypotension. For example, doses of 20 mg./kg. in one test and 10 mg./kg. in another test of the compound 1-(2',4'-dimethylphenyl)-3-methyl-2-thiourea produced good hypotensive results orally. In another test, the compound 1,1-dimethyl-3-(2'-methylphenyl)-2-thiourea produced both systolic and diastolic hypotension when administered orally to two hypertensive dogs both at 1.25 mg./kg. and at 2.50 mg./kg. doses.

It will be apparent from the foregoing description that a new and useful method of treating hypertension in mammals has been discovered. Many modifications of the process described herein will undoubtedly occur to those skilled in the art and this application for Letters Patent is intended to cover all such modifications as would reasonably fall within the scope of the appended claims.

What is claimed is:
1. A method of treating hypertension in mammals comprising the step of administering to a hypertensive mammal a small but effective amount of a compound selected from the group consisting of 1-(2',4'-dimethylphenyl)-3-methyl-2-thiourea, 1-(2',3'-dimethylphenyl)-3-methyl-2-thiourea, and 1,1-dimethyl-3-(2'-methylphenyl)-2-thiourea.
2. The method of claim 1 in which the compound is 1-(2',4'-dimethylphenyl)-3-methyl-2-thiourea.
3. The method of claim 1 in which the compound is 1-(2',3'-dimethylphenyl)-3-methyl-2-thiourea.
4. The method of claim 1 in which the compound is 1,1-dimethyl-3-(2'-methylphenyl)-2-thiourea.

References Cited

UNITED STATES PATENTS 3,178,348  4/1965  Bickerton _____ 107—654

ALBERT T. MEYERS, *Primary Examiner.*

S. J. FRIEDMAN, *Assistant Examiner.*